Patented June 26, 1934

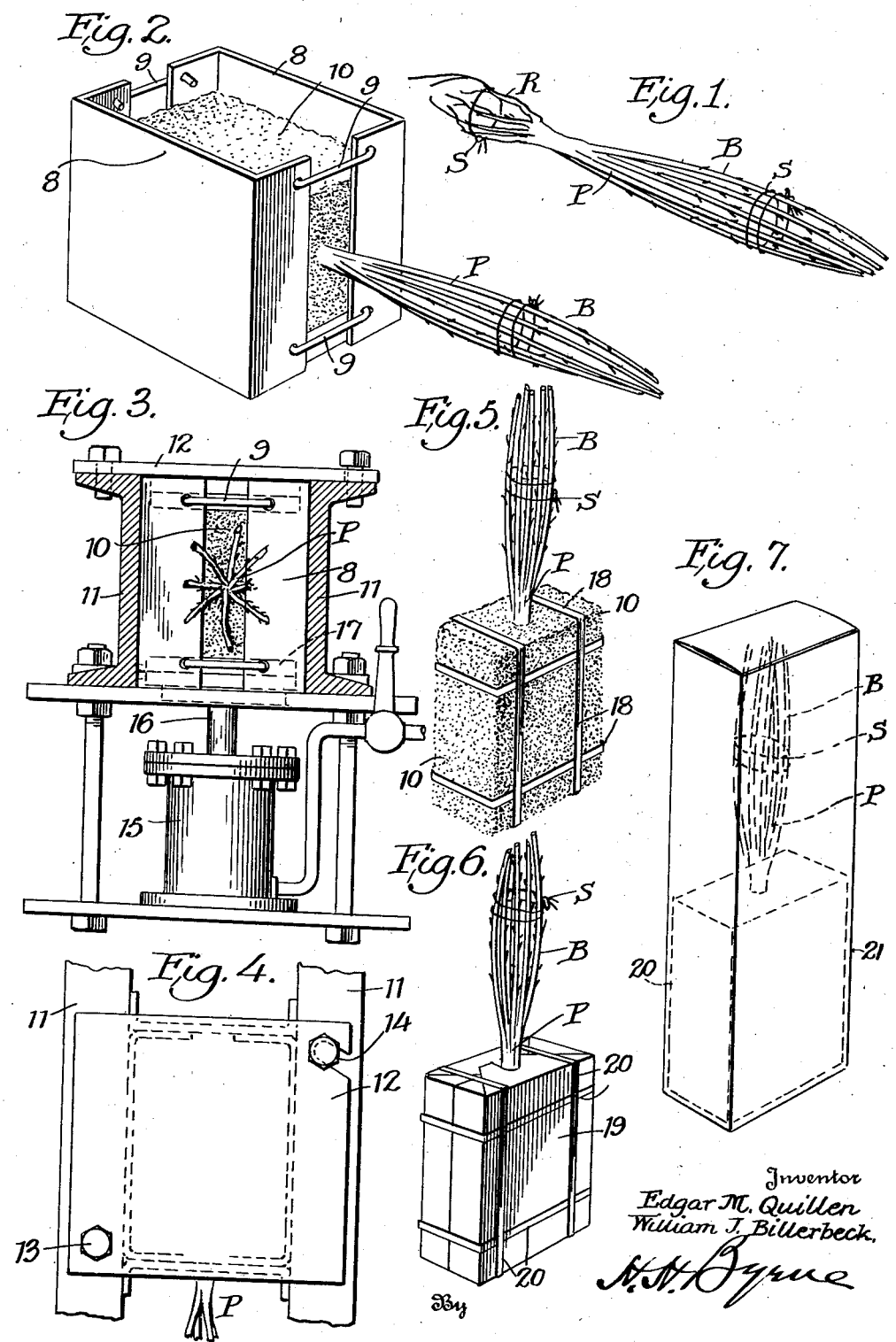

1,964,689

UNITED STATES PATENT OFFICE 1,964,689

METHOD OF PREPARING NURSERY PRODUCTS FOR TRANSPLANTING, COMPOUND, AND PACKAGE THEREFOR

Edgar M. Quillen and William J. Billerbeck, Waynesboro, Va., assignors to Titus Nursery Company, Waynesboro, Va.

Application February 10, 1933, Serial No. 656,158

9 Claims. (Cl. 47—37)

The present invention relates to a method of preparing nursery products for transplanting, compound, and package therefor, and consists in the novel steps of procedure, and combinations and arrangements of ingredients forming the package as hereinafter described and particularly set forth in the claims.

In the transplanting of nursery products comparatively few people are competent to do the required work in a proper way, and as a consequence of this ignorance there is much wasted energy, disappointment in results, and a considerable waste of money and plants that might otherwise be saved if the transplanting were done in a scientific manner. Furthermore, due to this inadequate knowledge and cultural information by home owners and gardeners many plants are actually killed in the attempts of transplanting, or in efforts made to encourage their growth. A further contributing cause to this situation is the lack of knowledge as to pruning, the kinds of soil required for obtaining the best growth, how deep to set or place the plants, the kind and amount of fertilizer to use, and obviously a competent knowledge of these essentials is required for any degree of success in nursery planting and gardening.

To overcome the above enumerated disadvantages the present invention proposes a novel and effective process whereby anyone with ordinary care may carry on the work of transplanting, and wherein highly successful results are obtainable without requiring special skill or knowledge either in the steps of transplanting or in the packaging of the products. That is to say, the method of transplanting herein described seeks to eliminate all of the hazards now encountered in transplanting living dormant plants, and give good results with the minimum care and knowledge.

The essential steps in carrying out the process and the novel package therefor employed are succinctly set forth in the accompanying drawing, wherein the several figures portray or illustrate the successive steps in the transplanting operation and salient features of the package and its component parts.

In carrying out the process we employ a package composed of the following ingredients by weight: super phosphate two parts, ground limeweight: super phosphate two parts, ground limestone one part, peat moss twelve parts, top soil twelve parts, vegetable meal four parts, the whole being formed into a compact block or unit as herein described. The limestone is employed to counteract the acid normally contained in the peat moss, and in like manner any natural acidity in the soil. The lime naturally adds to the encouragement of the plant and aids in its growth.

In making up the compound these ingredients are mixed together and thoroughly saturated with water to make them plastic. One-half of the quantity required for each plant is then placed in a steel box or other suitable container, and the plant is then root-pruned and inserted into the box when the other half quantity of composition is added. Pressure is then applied to the material in the container which thereby forms or shapes the same into a brick-like unit or mass about the roots. By this method the resultant product is a compressed block of well fertilized humus and plant food in the best proportions for healthy progress of the plant under normally varying conditions.

After removal from the container or form, the block or unit is suitably secured by rubber strips or bands which offer no hindrance to its handling or placement in the ground or growth thereafter. The plant is then top-pruned and dipped into a wax preparation to entrap its contained moisture and prevent escapement thereof through the top of the plant.

The root block is then securely wrapped with asphalt-coated paper to prevent escapement of moisture, and this waterproof paper is effectively sealed with an application of heat where it overlaps, thereby giving a completely waterproofed plant that effectively prevents all escapement of moisture.

The customer who eventually plants the product is instructed to entirely remove this outer covering paper so that the placed root block or unit has direct contact with the garden soil, and can thereby continuously absorb moisture from the surrounding earth. It is contemplated to effectively wrap the waterproof plant in an attractive carton which bears complete instructions for handling and planting.

It will therefore be seen that all likelihood of error is eliminated and the usual hazards attending the transplanting purpose are avoided. Apart from the fact that the plant is actually pruned and fertilized properly one of the outstanding advantages of our process is that all waterproof coating is removed from the root block preparatory to setting in the ground. Any waterproofing which would operate to prevent or retard the escape of moisture in transit would also preclude the plant's absorbing moisture when set in the ground unless this waterproofing were removed.

The herein described method of preparing the soil block under pressure and then securing the same into definite shape or block with rubber straps (e. g. rubber bands) makes it rigid enough for transferring from the package to the soil, and yet permits removal of the outer package of waterproofing material.

It is the purpose of this pre-planting to surround the roots of the block with ideal plant foods and growing conditions so far as possible. And in this instance peat moss is utilized mainly because of its great moisture carrying capacity since it contains little or no food value. It also aids in making the plant package light and easily handled.

The root-surrounding block of applicants' plant package includes equal parts of peat moss and top soil and relatively small parts of phosphate, limestone and vegetable meal. It has been found that a root-surrounding block having as its principal ingredients peat moss and top soil in equal parts, possesses advantages over the heretofore known root-surrounding blocks in that it has superior moisture-retaining qualities, it may be more uniformly pressed into contact with the roots of the plant, and will start to stimulate the growth of the plant in shorter time after the root block has been set in the ground.

The procedure or steps followed and apparatus used in putting up the plant packages, as above described, is shown by way of illustration in the accompanying drawing wherein:

Figure 1 shows a plant preparatory to being packaged.

Figure 2 a perspective view of the plant in the container for compressing the compound about the roots thereof.

Figure 3 a side elevational view of the container and plant in the compress.

Figure 4 a top plan view thereof.

Figure 5 shows the plant with root compound pressed thereon, and ready to be wrapped or put in a package for shipping.

Figure 6 shows the packaged plant and likewise in condition preparatory to final wrapping ready for planting.

Figure 7 illustrates the plant in its final package.

Referring to the figures in further detail P indicates the plant to be put up, having its roots R and branches B suitably secured by binders S of string or other appropriate devices. The container is composed of two similar parts 8 detachably connected by links or bales 9, and in which the composition 10 is initially placed for packing about the roots R.

The container 8 is placed in the compress 11 and the top 12 closed as shown in Figure 4. Said top plate is hinged at 13 and is notched to engage the stop and holding bolt 14. 15 indicates the pressure cylinder having piston rod 16 carrying piston 17.

After removal from the press the compressed material or soil block 10 has rubber bands 18 applied as shown in Figure 5. The branches B are then trimmed and wax-dipped, and the plant is then wrapped by paper 19 and secured by suitable cord or other binding 20 as in Figure 6. Following this the article is ready for placing in the cardboard or other box 21 as in Figure 7. The rubber bands 18 extend horizontally and vertically about the soil block 10. The horizontal bands are located at opposite sides of the horizontal center of the block, and the vertical bands are located at opposite sides of the vertical center of the block. Due to their elasticity and to the manner in which they are arranged on the block, the bands hold the block against collapsing during the application of the wrapper, during the removal of the wrapper and while the block is being placed in the ground. As the block comprises equal parts of top soil and peat moss, and as the block consists mainly of these ingredients, the block binds well under the compressing forces exerted thereon by the elastic bands.

It is to be understood the invention as herein disclosed is not limited to the precise process and packaging, but on the other hand may be varied in its details and application within the scope of the claims.

What is claimed as new is:

1. A plant package comprising, by weight, top soil twelve parts, peat moss twelve parts, superphosphate two parts, limestone one part, vegetable meal four parts, and a suitable solvent, substantially as set forth.

2. The method of packaging plants which consists in compressing about the roots thereof a plastic mass of suitable ingredients, tying the same into definite shape with elastic bands, and enclosing and securing the compressed and tied mass in a waterproof wrapper, substantially as set forth.

3. The method of packaging plants which consists in compressing within a container approximately one-half the required quantity of growth producing ingredients in plastic condition, pruning the roots of the plant and inserting the same into said container, then adding and compressing about said roots another quantity of the same material, removing said container from the compressed material, and finally binding and securing the compressed material, substantially as set forth.

4. The method of packaging plants which consists in compressing within a container a limited quantity of suitable growth producing ingredients in plastic condition, pruning the plant roots and inserting the same into said container, adding and compressing about said roots another quantity of the same material, removing said container from the compressed material, binding and securing the compressed material, and finally pruning the tops of the plant and dipping the same in a wax preparation, as and for the purpose set forth.

5. The method of packaging plants which consists in compressing within a container a limited quantity of suitable growth producing ingredients in plastic condition, inserting the plant roots into said container, then adding and compressing about said roots another quantity of the same material, removing said container from the compressed material, binding and securing the compressed material, and temporarily wrapping the compressed and bound material with a suitable moisture-proof paper, as and for the purpose set forth.

6. The method of packaging plants which consists in compressing within a container approximately one-half the required quantity of growth producing ingredients in plastic condition, pruning the roots of the plant and inserting the same into said container, adding and compressing about said roots another quantity of the same material, removing said container from the compressed material, binding and securing the compressed material, and finally pruning the tops of the plant and dipping the same into a wax preparation, as and for the purpose set forth.

7. The method of packaging plants which consists in compressing within a container approximately one-half the required quantity of growth producing ingredients in plastic condition, pruning the roots of the plant and inserting the same into said container, adding and compressing about said roots another quantity of the same material, removing said container from the compressed material, binding and securing the compressed material with elastic bands, wrapping the compressed and bound material with a suitable moisture-proof paper, and finally pruning the tops of the plant and dipping the same into a wax preparation, as and for the purpose set forth.

8. A plant package comprising a block of plastic material adapted to surround the roots of a plant, and elastic bands extending vertically and horizontally about the block, the vertical bands being arranged at opposite sides of the vertical center of the block, the horizontal bands being arranged at opposite sides of the horizontal center of the block, and the bands exerting compressive forces on the block to prevent it from collapsing.

9. A plant package comprising a block adapted to surround the roots of a plant and including equal parts of peat moss and top soil, and elastic means exerting compressive forces on the block to prevent it from collapsing.

EDGAR M. QUILLEN.
WILLIAM J. BILLERBECK.